(12) United States Patent
Sato

(10) Patent No.: US 11,330,123 B2
(45) Date of Patent: May 10, 2022

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Naoko Sato, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/060,744

(22) Filed: Oct. 1, 2020

(65) Prior Publication Data

US 2021/0281693 A1    Sep. 9, 2021

(30) Foreign Application Priority Data

Mar. 5, 2020   (JP) .............................. JP2020-037979

(51) Int. Cl.
*H04N 1/00*   (2006.01)

(52) U.S. Cl.
CPC ..... *H04N 1/00506* (2013.01); *H04N 1/00408* (2013.01); *H04N 2201/0094* (2013.01)

(58) Field of Classification Search
CPC ........... H04N 1/00506; H04N 1/00408; H04N 2201/0094; H04N 1/00501; H04N 1/00509; H04N 1/00413
See application file for complete search history.

(56) References Cited

U.S. PATENT DOCUMENTS

| | | | |
|---|---|---|---|
| 10,419,630 B2 | 9/2019 | Kato | |
| 10,554,838 B2 | 2/2020 | Kato | |
| 2012/0233538 A1* | 9/2012 | Negoro | G06F 3/0481 715/234 |
| 2014/0149894 A1* | 5/2014 | Watanabe | G06F 3/0481 715/761 |
| 2016/0098172 A1* | 4/2016 | Bacinschi | G06F 8/38 715/747 |
| 2016/0219171 A1* | 7/2016 | Ebitani | H04N 1/00474 |
| 2017/0331964 A1* | 11/2017 | O | H04N 1/00474 |
| 2018/0234581 A1* | 8/2018 | Asai | H04N 1/32122 |
| 2018/0357071 A1* | 12/2018 | Hu | G06F 9/451 |
| 2019/0004688 A1* | 1/2019 | Bowen | G06T 11/60 |
| 2020/0153990 A1 | 5/2020 | Kato | |
| 2020/0304626 A1* | 9/2020 | Phillips | G07F 9/023 |

FOREIGN PATENT DOCUMENTS

| | | |
|---|---|---|
| JP | 2014-128009 A | 7/2014 |
| JP | 2019-113999 A | 7/2019 |

* cited by examiner

*Primary Examiner* — Iriana Cruz
(74) *Attorney, Agent, or Firm* — Oliff PLC

(57) ABSTRACT

An information processing device includes a processor configured to receive an addition of additional information by an administrator, and cause a display position of an image representing the additional information to be restricted in a case where an important attribute indicating importance is assigned to the additional information.

20 Claims, 12 Drawing Sheets

FIG. 3

| ADDITIONAL INFORMATION NAME | IMPORTANT ATTRIBUTE | REPLACEMENT ATTRIBUTE | REPLACES |
|---|---|---|---|
| TRANSMIT IMAGE | Y | N | - |
| READ IMAGE | N | N | - |
| DESTINATION LIST | Y | N | - |
| PRINT HISTORY | N | N | - |
| PRINT IMAGE | Y | N | - |
| SIMPLE IMAGE PRINTING | Y | Y | PRINT IMAGE |
| .. | .. | .. | .. |

FIG. 4

| USER ID | PLACEABLE AREA | | | | | |
|---|---|---|---|---|---|---|
| | TRANSMIT IMAGE | READ IMAGE | DESTINATION LIST | PRINT HISTORY | SIMPLE IMAGE PRINTING | .. |
| H001 | P1 | AUTOMATIC | P3 | N/A | P2 | .. |
| H002 | P1 | AUTOMATIC | P2 | N/A | P4 | .. |
| H003 | P1 | MANUAL | N/A | MANUAL | N/A | .. |
| .. | .. | .. | .. | .. | .. | .. |

FIG. 10

```
                                                           22
┌─────────────────────────────────────────────────────┐
│          NEW ADDITIONAL INFORMATION WITH THE        │
│         FOLLOWING ATTRIBUTES HAS BEEN ADDED.        │
│                                                     │
│                                                     │
│    · NEW ADDITIONAL INFORMATION: SIMPLE IMAGE PRINTING │
│    · ATTRIBUTES: IMPORTANT, REPLACEMENT             │
│                                                     │
└─────────────────────────────────────────────────────┘
```

PLEASE INDICATE WHERE TO PLACE THE ICON REPRESENTING
THE FOLLOWING NEW ADDITIONAL INFORMATION.
THE ICON CAN BE PLACED INSIDE THE SHADED RANGE.

· NEW ADDITIONAL INFORMATION: SIMPLE IMAGE PRINTING

TRANSMIT IMAGE ·· DESTINATION LIST ··

⋮

PRINT HISTORY ··

FIG. 14

PLEASE INDICATE WHERE TO PLACE THE ICON REPRESENTING
THE FOLLOWING NEW ADDITIONAL INFORMATION.
( YOU CAN PLACE THE ICON ANYWHERE EXCEPT THE POSITIONS
WHERE THE ICONS REPRESENTING ADDITIONAL INFORMATION
WITH USAGE RIGHTS ARE ALREADY BEING DISPLAYED. )

· NEW ADDITIONAL INFORMATION: SIMPLE IMAGE PRINTING

| TRANSMIT IMAGE | .. | DESTINATION LIST | .. |

PRINT HISTORY  ..

FIG. 16

THE ICON REPRESENTING THE NEW
ADDITIONAL INFORMATION HAS BEEN PLACED
AUTOMATICALLY AT A PREDETERMINED POSITION.

| TRANSMIT IMAGE | .. | DESTINATION LIST | .. | SIMPLE IMAGE PRINTING |

| PRINT HISTORY | .. | ated under 35
INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-037979 filed Mar. 5, 2020.

BACKGROUND

(i) Technical Field

The present disclosure relates to an information processing device and a non-transitory computer readable medium.

(ii) Related Art

Japanese Unexamined Patent Application Publication No. 2019-113999 discloses an image processing apparatus provided with at least one of an image forming device that forms an image on a sheet and an image reading device that reads an image on a sheet, a storage device that stores information, and a display device that displays a screen. Application programs related to the image forming device or the image reading device are installed in the image processing apparatus, and the image processing apparatus is provided with a controller that determines, on the basis of a condition stored in the storage device, whether or not to cause an execution instruction image for inputting an instruction to execute an installed application program to be displayed on a personalized home screen, which is a home screen specific to a user. The controller causes the display device to display the personalized home screen containing each execution instruction image that has been determined to be displayed.

Japanese Unexamined Patent Application Publication No. 2014-128009 discloses an image processing system provided with a screen customizing means that customizes a screen for each user, a new user service adding means that adds a new user service to the image processing system, and an addition choosing means that chooses whether or not to add the added new user service to a customized screen.

SUMMARY

Certain issues exist in the related art. For example, an image representing additional information that has been added by an administrator may not be displayed, or the additional information may not be used in some cases as a result of the additional information being displayed in a hard-to-see location.

Aspects of non-limiting embodiments of the present disclosure relate to addressing the non-use of additional information compared to a case where the display position of an image representing the additional information is not restricted.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device includes a processor configured to receive an addition of additional information by an administrator, and cause a display position of an image representing the additional information to be restricted in a case where an important attribute indicating importance is assigned to the additional information.

BRIEF DESCRIPTION OF THE DRAWINGS

An exemplary embodiment of the present disclosure will be described in detail based on the following figures, wherein:

FIG. 3 is a schematic diagram illustrating an example of a configuration of an additional information database according to the exemplary embodiment;

FIG. 4 is a schematic diagram illustrating an example of a configuration of a user information database according to the exemplary embodiment;

FIG. 10 is a front view illustrating an example of an additional information presentation screen according to the exemplary embodiment;

FIG. 14 is a front view illustrating an example of an unrestricted placement information presentation screen according to the exemplary embodiment;

FIG. 16 is a front view illustrating an example of a third placement information presentation screen according to the exemplary embodiment.

DETAILED DESCRIPTION

Hereinafter, an exemplary embodiment for carrying out the present disclosure will be described in detail and with reference to the drawings. Note that the exemplary embodiment describes a case of applying a personal computer as the information processing device and applying an image forming device as the device to be controlled. Also, in the exemplary embodiment, a digital multi-function device including functions such as an image printing function, an image reading function, and an image transmitting function is applied as the image forming device, but obviously the image forming device is not limited thereto. Also, the exemplary embodiment describes a case in which the information processing device and the image forming device are configured as a unified device, but the information processing device and the image forming device may also be configured as separate devices.

Figure 1:
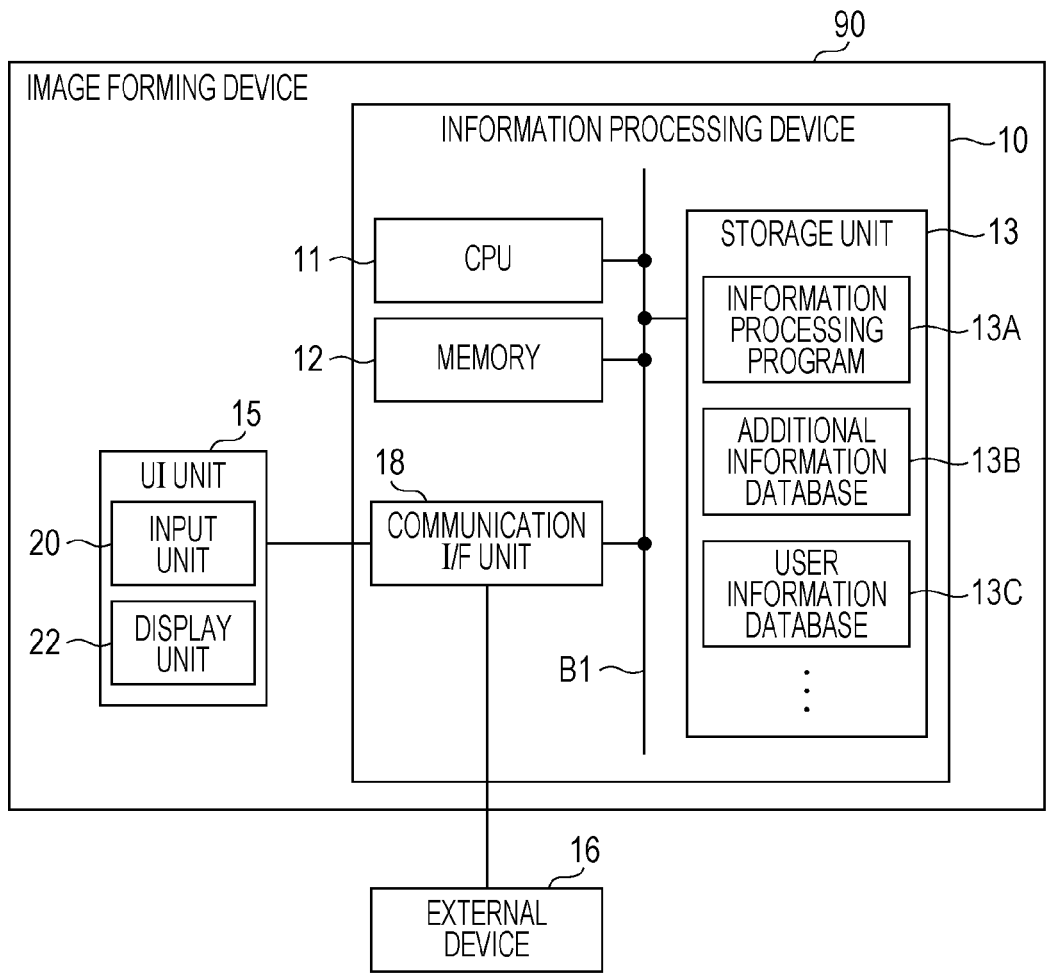
FIG. 1 is a block diagram illustrating an example of a hardware configuration of an image forming device according to an exemplary embodiment.

As illustrated in FIG. 1, an image forming device 90 according to the exemplary embodiment has a built-in information processing device 10. Also, the information processing device 10 according to the exemplary embodiment is provided with a central processing unit (CPU) 11 that acts as a processor, memory 12 that acts as a temporary storage area, a non-volatile storage unit 13, and a communication interface (I/F) unit 18. The CPU 11, the memory 12, the storage unit 13, and the communication I/F unit 18 are interconnected through a bus B1.

The storage unit 13 is realized by a hard disk drive (HDD), a solid-state drive (SSD), flash memory, or the like. An information processing program 13A is stored in the storage unit 13, which acts as a storage medium. The CPU 11 reads out and loads the information processing program 13A from the storage unit 13 into the memory 12, and sequentially executes processes included in the information processing program 13A. The storage unit 13 also stores an additional information database 13B and a user information database 13C. The additional information database 13B and the user information database 13C will be described in detail later.

A user interface (UI) unit 15 includes an input unit 20 and a display unit 22, and is also provided on the image forming device 90. The UI unit 15 and an external device 16 are connected to the communication I/F unit 18. Consequently, the CPU 11 is capable of transmitting and receiving various information with the UI unit 15 and the external device 16. Note that the input unit 20 includes a touch panel, and is used to input various information. Also, the display unit 22 includes a display such as a liquid crystal display or an organic electroluminescence (EL) display, and displays various information. Note that the input unit 20 and the display unit 22 may also be combined to function as a touch panel display.

Incidentally, the exemplary embodiment adopts a configuration in which a device such as a server managed by the manufacturer of the image forming device 90 is applied as the external device 16, and the external device 16 provides the image forming device 90 with application software for executing various services compatible with the image forming device 90. Also, in the exemplary embodiment, the application software is applied as the additional information.

Next, a functional configuration of the information processing device 10 according to the exemplary embodiment will be described. As illustrated in FIG. 3, the information processing device 10 includes a reception unit 11A and a control unit 11B. The CPU 11 of the information processing device 10 functions as the reception unit 11A and the control unit 11B by executing the information processing program 13A.

The reception unit 11A according to the exemplary embodiment receives the addition of additional information provided from the external device 16 by an administrator of the image forming device 90. Note that in the exemplary embodiment, application software for executing each of an image printing service, an image reading service, an image transmission service, and a simple image printing service, which is an image printing service that prints an image with relatively simple settings compared to the image printing service, is applied as the additional information. Also, in the exemplary embodiment, application software for executing each of a destination list service, which is a service that displays a list of destinations to which to transmit an image, a printing history service, which is a service that displays a list of the names of documents for which image printing has been executed, and a reading history service, which is a service that displays a list of the names of documents for which image reading has been executed, is applied as the additional information, but the configuration is not limited to the above.

For example, in addition to the above application software, other application software, such as application software for executing a service that displays a list of the names of documents for which image transmission has been executed, may also be included as the additional information, and configurations in which the above types of application software are applied individually or in combinations of multiple types of application software are also possible.

Also, in the case where the additional information is assigned an important attribute, which is an attribute indicating that the additional information is important, the control unit 11B according to the exemplary embodiment causes the display position of an image representing the additional information to be restricted. Also, in the exemplary embodiment, a restriction related to the placement of the position where the image is to be displayed and a restriction related to moving the display position of the image are applied as restrictions on the display position, but it is also possible to apply only one of the above restrictions. Note that in the following, an image representing additional information assigned the important attribute is referred to as an important image.

Also, the control unit 11B according to the exemplary embodiment additionally causes the display position of an image representing additional information not assigned the important attribute to be a predetermined position, but the configuration is not limited thereto. For example, a configuration that applies a position specified by a user of the image forming device 90 every time additional information is received by the reception unit 11A as the display position of an image representing the additional information that is not assigned the important attribute is also possible.

Also, the reception unit 11A according to the exemplary embodiment additionally receives the predetermined position. Note that in the exemplary embodiment, a position specified by the administrator before the additional information is received by the reception unit 11A is applied as the predetermined position, but a configuration that applies a position determined automatically according to properties such as the usage frequency of the additional information not assigned the important attribute is also possible.

Also, in the case where the additional information is assigned a replacement attribute, which is an attribute indicating that the additional information replaces other additional information corresponding to an image already being displayed, the control unit 11B causes an indication that the additional information is assigned the replacement attribute to be presented. Note that in the exemplary embodiment, the presentation of a screen by the display unit 22 is applied as the presentation, but the configuration is not limited thereto. For example, the presentation of sound by a sound output function of the image forming device 90 may also be applied as the presentation. Also, the control unit 11B according to the exemplary embodiment additionally causes the image already being displayed, or in other words the image (hereinafter referred to as the "pre-replacement image") representing the additional information (hereinafter referred to as the "pre-replacement additional information") that is replaced by the additional information assigned the replacement attribute, not to be displayed.

Also, before causing the pre-replacement additional information to be replaced by the additional information assigned the replacement attribute (hereinafter referred to as the "post-replacement additional information"), the control unit 11B according to the exemplary embodiment additionally causes the pre-replacement image to be displayed in an identifiable way. Also, the control unit 11B according to the exemplary embodiment additionally causes the important image to be displayed in an identifiable way.

Also, in the exemplary embodiment, an emphasized display is applied as the method of displaying an image in an identifiable way. Note that in the exemplary embodiment, a display method that attaches other information to the pre-replacement image and the important image is applied as the emphasized display, but the configuration is not limited thereto. For example, a display method that differentiates at least one of the color and the shape of the pre-replacement image and the important image from other images may also be applied as the emphasized display, and configurations in which these display methods are applied individually or in combinations of multiple display methods are also possible. Also, in the exemplary embodiment, an icon is applied as the image representing additional information (hereinafter referred to as an "additional image").

Next, the additional information database 13B according to the exemplary embodiment will be described. As illustrated in FIG. 3, the additional information database 13B according to the exemplary embodiment stores information about the additional information name, the important attribute, the replacement attribute, and the target of replacement in association with each other.

The additional information name is information indicating the name of additional information received as an addition by the administrator, while the important attribute is information indicating the presence or absence of the important attribute with respect to the corresponding additional information, and the replacement attribute is information indicating the presence or absence of the replacement attribute with respect to the corresponding additional information. Note that in the example illustrated in FIG. 3, "Y" denotes the case where the attribute is assigned, and "N" denotes the case where the attribute is not assigned.

The target of replacement is information indicating the name of the pre-replacement additional information that the corresponding additional information replaces. Note that in the example illustrated in FIG. 3, in the case where the replacement attribute is not assigned to the corresponding additional information and pre-replacement additional information corresponding to the additional information does not exist, "-" is used to denote information indicating the name of the pre-replacement additional information, but the configuration is not limited thereto. In the example illustrated in FIG. 3, for instance, the additional information with the name "Simple Image Printing" is assigned the important attribute and the replacement attribute, and the pre-replacement additional information corresponding to the additional information is the additional information with the name "Image Printing".

Next, the user information database 13C according to the exemplary embodiment will be described. As illustrated in FIG. 4, the user information database 13C according to the exemplary embodiment stores information about a user identification (ID) and a placeable area in association with each other.

The user ID is information for specifying a user who uses the image forming device 90, and is preassigned as information that is different for each user. The placeable area is information indicating an area where the corresponding additional image is placeable on the display unit 22 by the corresponding user. Note that in the example illustrated in FIG. 4, in the case where a right to use the corresponding additional information is not granted to the corresponding user, "N/A" is used to denote information indicating the placeable area, but the configuration is not limited thereto.

Also, in the example illustrated in FIG. 4, in the case where a right to use the corresponding additional information is granted to the corresponding user and the additional information is also assigned the important attribute, an area (such as the area P1 and the area P2 described later) where the additional image is placeable on the display unit 22 is used to denote information indicating the placeable area, but the configuration is not limited thereto. Also, in the example illustrated in FIG. 4, if a right to use the corresponding additional information is granted to the corresponding user but the additional information is not assigned the important attribute, "Automatic" is used to denote information indicating the placeable area in the case where the additional image is placed automatically in a predetermined position, while "Manual" is used to denote information indicating the placeable area in the case where the additional image is placed in a position specified by the corresponding user, but the configuration is not limited thereto.

Figure 5:
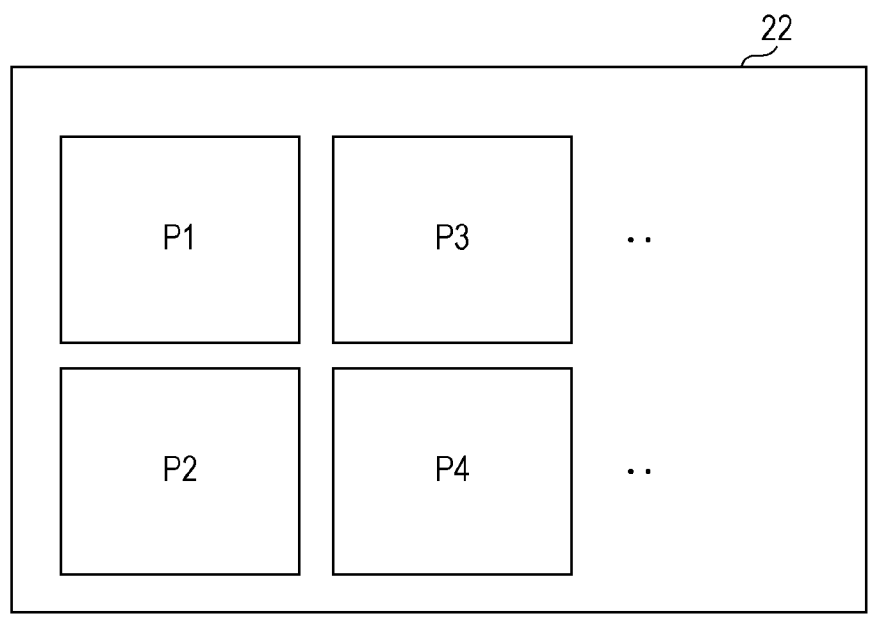
FIG. 5 is a front view illustrating an example of a display area according to the exemplary embodiment.

As illustrated in FIG. 5, the exemplary embodiment applies a configuration that defines the display areas of additional images by dividing the display unit 22 vertically into an upper and a lower row and treating the leftmost area in the upper row as an area P1, treating the leftmost area in the lower row as an area P2, treating the area to the right of the area P1 is treated as an area P3, treating the area to the right of the area P2 as an area P4, and so on, but the configuration is not limited thereto. For example, a configuration that divides the display unit 22 into more than two rows vertically or a configuration that does not divide the display unit 22 vertically may also be applied to define the display areas.

Also, in the exemplary embodiment, a configuration that does not accept a scroll operation performed by the user with respect to the screen displayed on the display unit 22 is applied, but a configuration that accepts a scroll operation may also be applied. In this case, a configuration that does not move the display areas of the additional images illustrated in FIG. 5 as an example even if the scroll operation is performed by the user is applied.

Consequently, the example illustrated in FIG. 4 illustrates that, in the case where the user assigned H001 as the user ID uses the image forming device 90, an additional image with the name "Transmit Image" is placeable in the area P1, an additional image with the name "Destination List" is placeable in the area P3, and an additional image with the name "Simple Image Printing" is placeable in the area P2 on the display unit 22. The example illustrated in FIG. 4 also illustrates that in this case, an additional image with the name "Read Image" is placed automatically in a predetermined position on the display unit 22. Also, the example illustrated in FIG. 4 illustrates that a right to use the additional information with the name "Print History" is granted to the user assigned H001 as the user ID, for example.

Next, FIGS. 6 to 16 will be referenced to describe the action of the information processing device 10 according to the exemplary embodiment. First, FIGS. 6 to 8 will be referenced to describe the action of the information processing device 10 when additional information is provided by the external device 16 and information related to the additional information is registered in the additional information database 13B and the user information database 13C by the administrator. Note that to avoid confusion herein, a case is described in which some information is already registered in the additional information database 13B and the user information database 13C.

Figure 6:
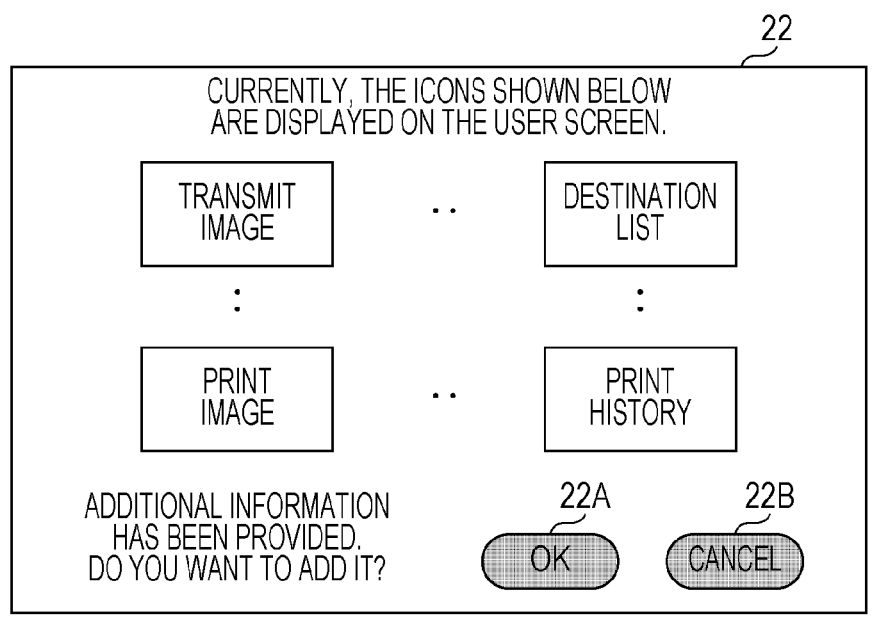
FIG. 6 is a front view illustrating an example of an image presentation screen according to the exemplary embodiment.

First, the CPU 11 controls the display unit 22 to display an image presentation screen having a predetermined configuration. As illustrated in FIG. 6, the additional images representing additional information for which usage rights are granted from among the additional information already registered in the user information database 13C and a message indicating that additional information has been newly provided are displayed on the image presentation screen according to the exemplary embodiment. If the image presentation screen illustrated in FIG. 6 as an example is displayed on the display unit 22, the administrator specifies an OK button 22A through the input unit 20 in the case of adding the additional information provided by the external device 16, and specifies a Cancel button 22B through the input unit 20 in the case of not adding the additional information provided by the external device 16.

Figure 7:
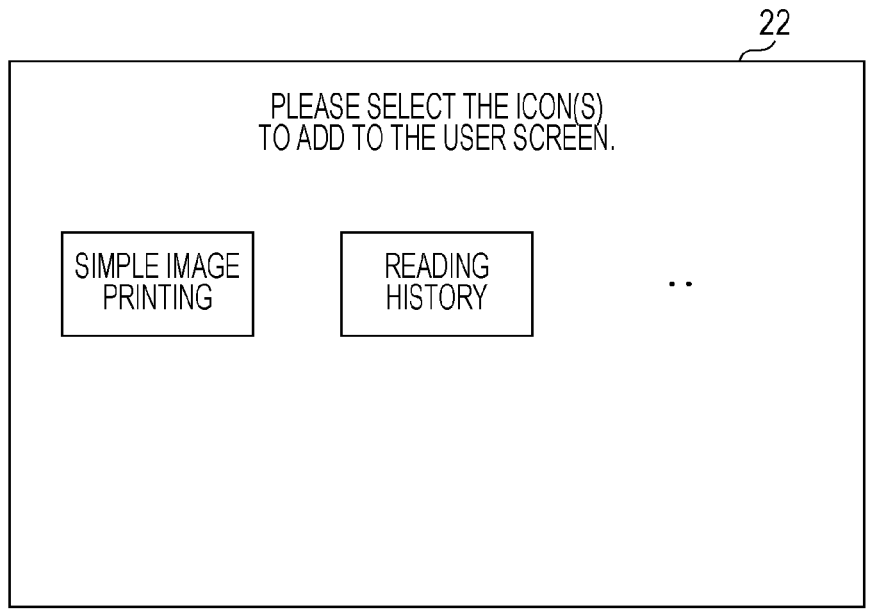
FIG. 7 is a front view illustrating an example of an additional image selection screen according to the exemplary embodiment.

If the OK button 22A is specified through the input unit 20 by the administrator, the CPU 11 causes the display unit 22 to display an additional image selection screen having a predetermined configuration. As illustrated in FIG. 7, additional images representing the provided additional information and a message prompting the administrator to select an additional image representing the desired additional information to add (hereinafter referred to as "new additional information") are displayed on the additional image selection screen according to the exemplary embodiment. If the additional image selection screen illustrated in FIG. 7 as an example is displayed on the display unit 22, the administrator specifies the additional image representing the new additional information (hereinafter referred to as the "new additional image") through the input unit 20.

Figure 8:
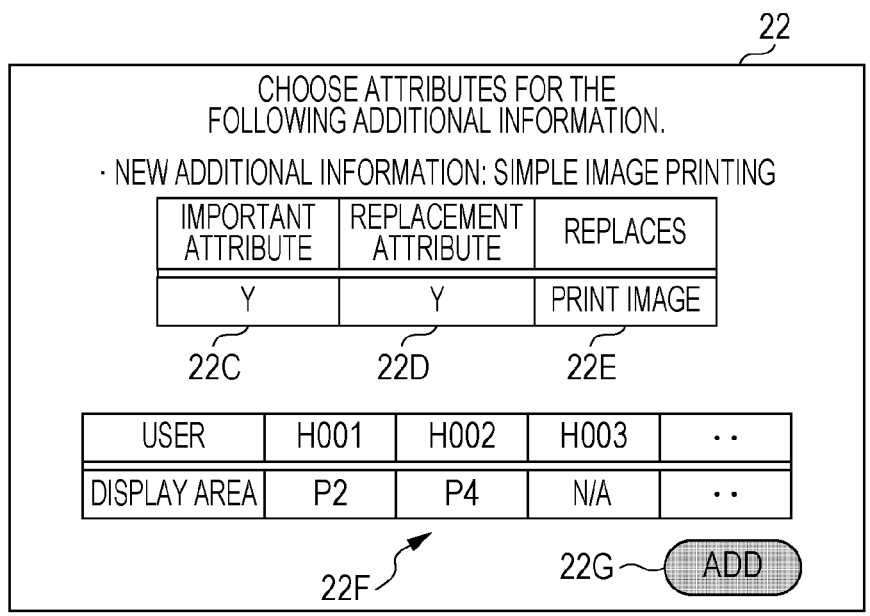
FIG. 8 is a front view illustrating an example of an attribute determination screen according to the exemplary embodiment.

If a new additional image is specified through the input unit 20 by the administrator, the CPU 11 causes the display unit 22 to display an attribute determination screen having a predetermined configuration. As illustrated in FIG. 8, the name of the new additional information, an input area 22C for inputting whether or not to assign the important attribute to the new additional information, an input area 22D for inputting whether or not to assign the replacement attribute to the new additional information, and an input area 22E for inputting the name of the pre-replacement additional information are displayed on the attribute determination screen according to the exemplary embodiment.

Note that in the example illustrated in FIG. 8, "Y" is input into the input area 22C in the case of assigning the important attribute to the new additional information while "N" is input in the case of not assigning the attribute, and similarly, "Y" is input into the input area 22D in the case of assigning the replacement attribute while "N" is input in the case of not assigning the attribute. However, the configuration is not limited thereto. Also, in the example illustrated in FIG. 8, in the case of not assigning the replacement attribute to the new additional information, "-" is input into the input area 22E, but the configuration is not limited thereto. For instance, the illustrated in FIG. 8 illustrates that the additional information with the name "Simple Image Printing" is assigned the important attribute and the replacement attribute, and the pre-replacement additional information is the additional information with the name "Image Printing".

Also, as illustrated in FIG. 8, on the attribute determination screen according to the exemplary embodiment, an input area 22F for inputting the placeable area on the display unit 22 of the new additional image for each user is displayed. Note that in the example illustrated in FIG. 8, "N/A" is input into the input area 22F in the case of not granting the right to use the new additional information to the corresponding user, but the configuration is not limited thereto. Also, in the example illustrated in FIG. 8, in the case where a right to use the new additional information is granted to the corresponding user and the new additional information is also assigned the important attribute, an area where the new additional image is placeable on the display unit 22 (an area such as the area P1 or the area P2) is input into the input area 22F, but the configuration is not limited thereto. Also, in the example illustrated in FIG. 8, in the case where a right to use the new additional information is granted to the corresponding user but the new additional information is not assigned the important attribute, "Automatic" is input into the input area 22F if the new additional image is to be placed automatically in a predetermined position, while "Manual" is input if the new additional image is to be placed in a position specified by the corresponding user, but the configuration is not limited thereto.

For instance, the example illustrated in FIG. 8 illustrates that the additional image with the name "Simple Image Printing" is placeable in the area P2 on the display unit 22 in the case where the user assigned H001 as the user ID uses the image forming device 90, and is placeable in the area P4 in the case where the user assigned H002 as the user ID uses the image forming device 90. The example illustrated in FIG. 8 also illustrates that a right to use the additional information with the name "Simple Image Printing" is not granted to the user assigned H003 as the user ID.

If the attribute determination screen illustrated in FIG. 8 as an example is displayed on the display unit 22, the administrator inputs appropriate information into each of the input areas 22C to 22F through the input unit 20, and after inputting information into all of the input areas, the administrator specifies an Add button 22G through the input unit 20. In response, the CPU 11 registers the information input by the administrator on the attribute determination screen in the additional information database 13B and the user information database 13C as information related to the new additional information.

Figure 9:
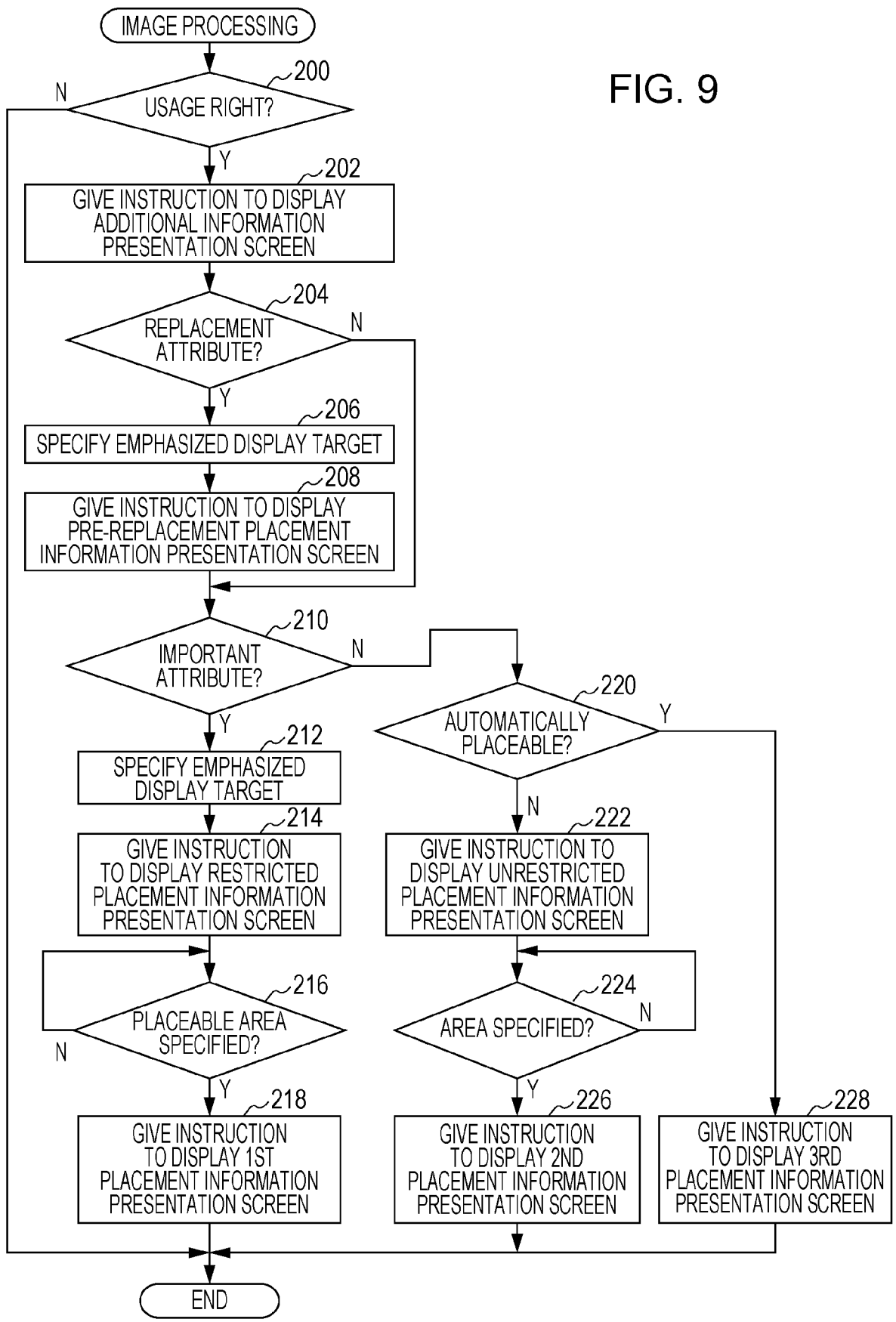
FIG. 9 is a flowchart illustrating an example of information processing according to the exemplary embodiment.

Next, FIGS. 9 to 16 will be referenced to describe the actions of the information processing device 10 in the case of executing information processing. In the case where one of the users uses the image forming device 90, the information processing illustrated in FIG. 9 is executed by having the CPU 11 of the information processing device 10 execute the information processing program 13A. Note that to avoid confusion herein, a case is described in the additional information database 13B and the user information database 13C are already constructed. Also, to avoid confusion herein, a case is described in which a new additional image not assigned the important attribute is to be placed automatically in a predetermined position, the predetermined position has already been received by the reception unit 11A, and the position is stored in the storage unit 13. Also, to avoid confusion herein, processes related to image forming are omitted.

In step 200 of FIG. 9, the CPU 11 reads out information related to the user who is using the image forming device 90 (hereinafter referred to as the "target user") from the user information database 13C, and determines whether or not the target user has a right to use the new additional information. In the case of a positive determination, the CPU 11 proceeds to step 202, whereas in the case of a negative determination, the CPU 11 ends the information processing.

In step 202, the CPU 11 reads out information related to the new additional information from the additional information database 13B, and causes the display unit 22 to display the additional information presentation screen that displays the new additional information and the attributes assigned to the new additional information.

As illustrated in FIG. 10, the name of the new additional information (in the example illustrated in FIG. 10, "Simple Image Printing") and the attributes assigned to the new additional information (in the example illustrated in FIG. 10, the important attribute and the replacement attribute) are displayed on the additional information presentation screen according to the exemplary embodiment. Consequently, by referring to the additional information presentation screen, the target user is able to grasp the name of the new additional information and the attributes assigned to the new additional information.

In step 204, the CPU 11 references the additional information database 13B to determine whether or not the replacement attribute is assigned to the new additional information. In the case of a negative determination, the CPU 11 proceeds to step 210 described later, whereas in the case of a positive determination, the CPU 11 proceeds to step 206. In step 206, the CPU 11 references the additional information database 13B and specifies the pre-replacement additional information corresponding to the new additional information as the target of an emphasized display. Next, in step 208, the CPU 11 causes the display unit 22 to display a pre-replacement placement information presentation screen that presents pre-replacement placement information, which is information indicating that the new additional information will replace the pre-replacement additional information.

Figure 11:
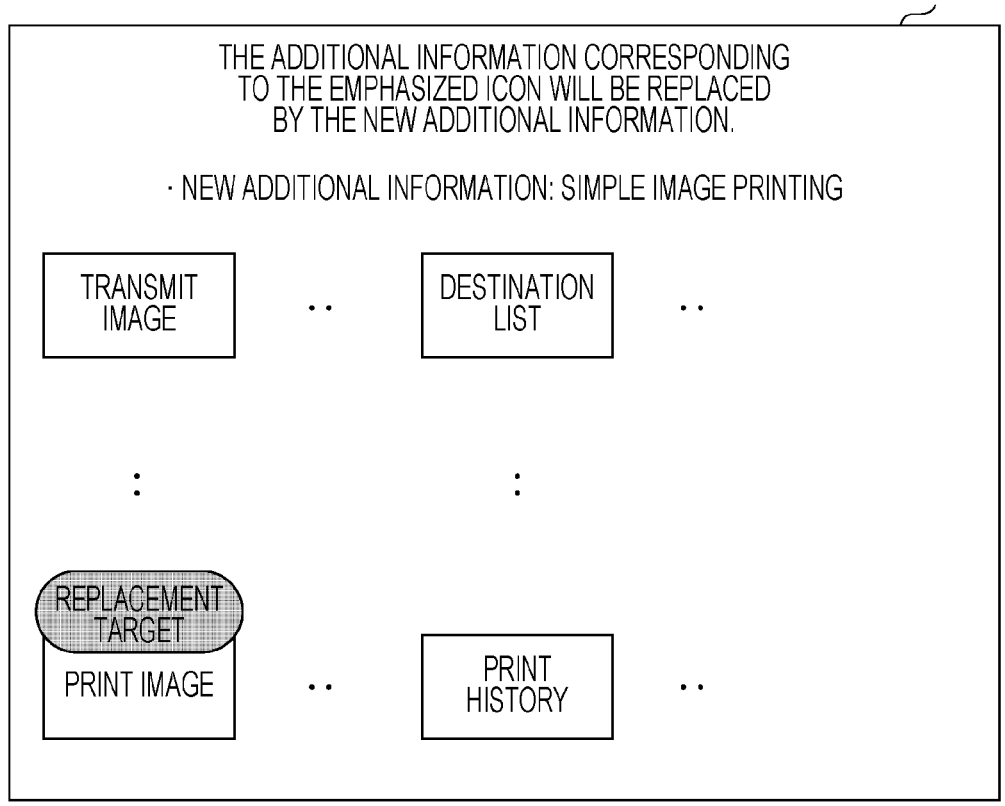
FIG. 11 is a front view illustrating an example of a pre-replacement placement information presentation screen according to the exemplary embodiment.

As illustrated in FIG. 11, on the pre-replacement placement information presentation screen according to the exemplary embodiment, the name of the new additional information (in the example illustrated in FIG. 11, "Simple Image Printing") and the additional image(s) for which the target user has usage rights are displayed, while in addition, the pre-replacement image (in the example illustrated in FIG. 11, the additional image with the name "Print Image") is displayed in an emphasized way. Note that each image is displayed by having the CPU 11 reference a predetermined area in the storage unit 13. Consequently, by referring to the pre-replacement placement information presentation screen, the target user is able to grasp the name of the new additional information, the names of the additional information for which usage rights are granted and the name of the pre-replacement additional information, and also the display positions of the additional images.

In step 210, the CPU 11 references the additional information database 13B to determine whether or not the important attribute is assigned to the new additional information. In the case of a negative determination, the CPU 11 proceeds to step 220 described later, whereas in the case of a positive determination, the CPU 11 proceeds to step 212.

In step 212, the CPU 11 references the additional information database 13B and specifies the new additional information as a target of an emphasized display. Next, in step 214, the CPU 11 references the user information database 13C and causes the display unit 22 to display a restricted placement information presentation screen that presents restricted placement information, which is information indicating that the placement position of the new additional information is to be specified inside the range of the placeable area.

Figure 12:
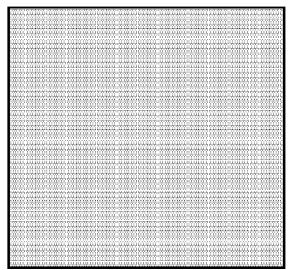
FIG. 12 is a front view illustrating an example of a restricted placement information presentation screen according to the exemplary embodiment.

As illustrated in FIG. 12, on the restricted placement information presentation screen, the name of the new additional information (in the example illustrated in FIG. 12, "Simple Image Printing"), the additional images for which the target user has usage rights, and a message prompting the target user to specify the placement position of the new additional image inside the range of the placeable area are displayed, while in addition, the placeable area corresponding to the new additional information is displayed as a shaded area. Note that the additional images for which usage rights are granted are displayed by having the CPU 11 reference a predetermined area in the storage unit 13. Also, on the restricted placement information presentation screen according to the exemplary embodiment, shading is used to indicate the placeable area, but the configuration is not limited thereto, and the placeable area may also be indicated by being displayed in a different color from other areas, or by using a display method such as a blinking display or an inverted display. If the restricted placement information presentation screen illustrated in FIG. 12 as an example is displayed on the display unit 22, the target user specifies the placement position of the new additional image inside the range of the placeable area through the input unit 20.

Accordingly, in step 216, the CPU 11 stands by until the placement position of the new additional image is specified inside the range of the placeable area through the input unit 20. In step 218, the CPU 11 causes the display unit 22 to display a first placement information presentation screen that displays placement information, which is information indicating the specified placement position of the new additional image, and the CPU 11 ends the information processing.

Figure 13:
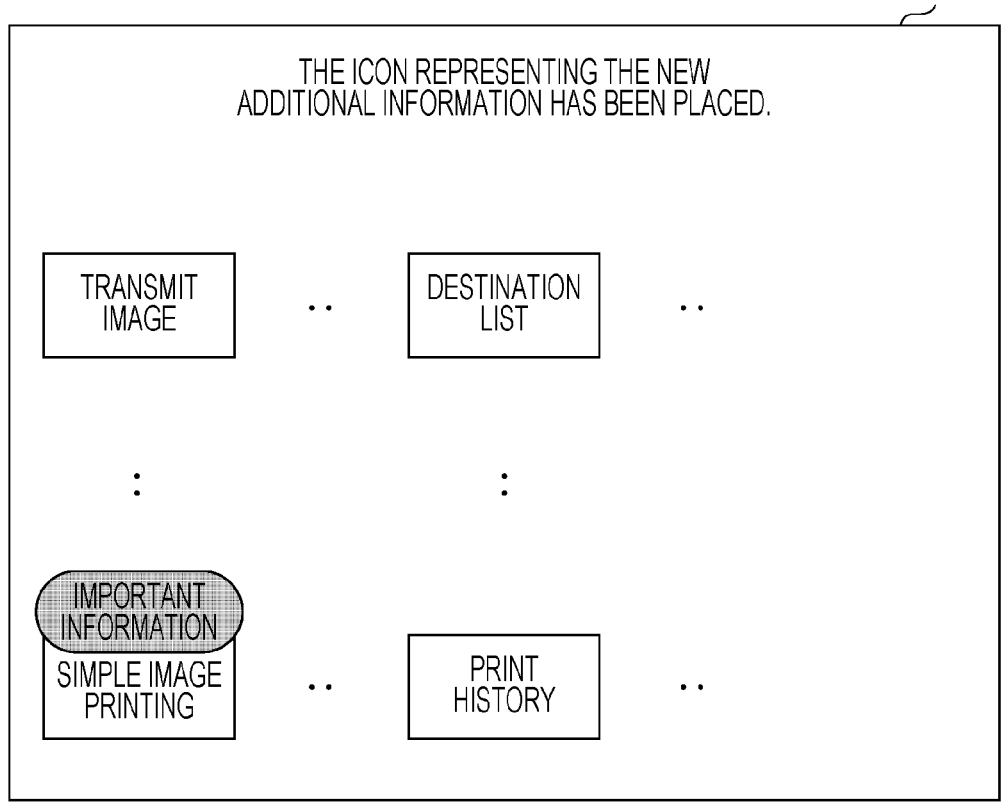
FIG. 13 is a front view illustrating an example of a first placement information presentation screen according to the exemplary embodiment.

As illustrated in FIG. 13, on the first placement information presentation screen according to the exemplary embodiment, the new additional image (in the example illustrated in FIG. 13, the additional image with the name "Simple Image Printing"), the additional images for which the target user has usage rights, and a message indicating that the new additional image has been placed are displayed, while in addition, the new additional image is displayed in an emphasized way. Note that the additional images for which usage rights are granted are displayed by having the CPU 11 reference a predetermined area in the storage unit 13. Consequently, by referring to the first placement information presentation screen, the target user is able to grasp the new additional image and the placement positions of the additional information for which usage rights are granted.

On the other hand, in step 220, the CPU 11 references the user information database 13C and determines whether or not to place the new additional image in a predetermined position automatically. In the case of a positive determination, the CPU 11 proceeds to step 228 described later, whereas in the case of a negative determination, the CPU 11 proceeds to step 222. In step 222, the CPU 11 causes the display unit 22 to display an unrestricted placement information presentation screen that presents unrestricted placement information, which is information indicating that the placement position of the new additional image may be specified at any position other than the display position of an additional image for which the target user has usage rights.

As illustrated in FIG. 14, on the unrestricted placement information presentation screen according to the exemplary embodiment, the name of the new additional information (in the example illustrated in FIG. 14, "Simple Image Printing"), the additional images for which the target user has usage rights, and a message prompting the target user to specify the placement position of the new additional image at a position other than the display positions of the additional images for which the target user has usage rights is displayed. Note that the additional images for which usage rights are granted are displayed by having the CPU 11 reference a predetermined area in the storage unit 13. If the unrestricted placement information presentation screen illustrated in FIG. 14 as an example is displayed on the display unit 22, the target user specifies the placement position of the new additional image at a position other than the display positions of the additional images for which the target user has usage rights through the input unit 20.

Accordingly, in step 224, the CPU 11 stands by until the placement position of the new additional image is specified at a position other than the display positions of the additional images for which the target user has usage rights. In step 226, the CPU 11 causes the display unit 22 to display a second placement information presentation screen that presents information indicating the specified placement position of the new additional image, and the CPU 11 ends the information processing.

Figure 15:
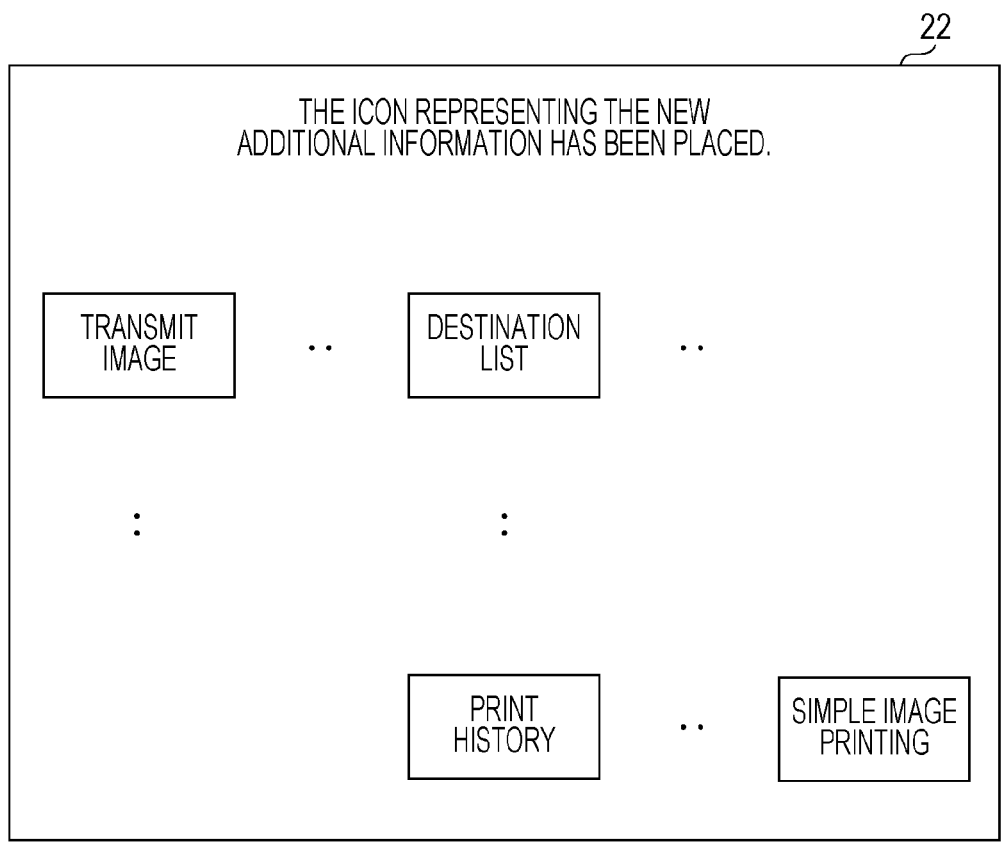
FIG. 15 is a front view illustrating an example of a second placement information presentation screen according to the exemplary embodiment.

As illustrated in FIG. 15, on the second placement information presentation screen according to the exemplary embodiment, the new additional image (in the example illustrated in FIG. 15, the additional image with the name "Simple Image Printing"), the additional images for which the target user has usage rights, and a message indicating that the new additional image has been placed are displayed. Note that the additional images for which usage rights are granted are displayed by having the CPU 11 reference a predetermined area in the storage unit 13. Consequently, by referring to the second placement information presentation screen, the target user is able to grasp the new additional image and the placement positions of the additional information for which usage rights are granted.

In step 228, the CPU 11 causes the display unit 22 to display a third placement information presentation screen that presents information indicating the specified placement position of the new additional image, and ends the information processing. As illustrated in FIG. 16, on the third placement information presentation screen according to the exemplary embodiment, the new additional image (in the example illustrated in FIG. 16, the additional image with the name "Simple Image Printing"), the additional images for which the target user has usage rights, and a message indicating that the new additional image has been placed automatically at a predetermined position are displayed. Consequently, by referring to the third placement information presentation screen, the target user is able to grasp the new additional image and the placement positions of the additional information for which usage rights are granted.

Note that in the case where the new additional information is assigned the replacement attribute, the pre-replacement image is not displayed on the first placement information presentation screen, the second placement information presentation screen, and the third placement information presentation screen according to the exemplary embodiment.

The foregoing describes an exemplary embodiment, but the technical scope of the present disclosure is not limited to the scope described in the foregoing exemplary embodiment. Various modifications or alterations may be made to the foregoing exemplary embodiment without departing from the scope of the present disclosure, and any embodiments obtained by such modifications or alterations are also included in the technical scope of the present disclosure.

Furthermore, the foregoing exemplary embodiment does not limit the present disclosure as stated in the claims, and not all combinations of features described in the exemplary embodiment are necessarily required as means for addressing the issues of the present disclosure. The exemplary embodiment described above includes various levels of disclosure, and the various disclosures are elicited through the combination of the multiple structural elements disclosed herein. Even if several structural elements are removed from among all of the structural elements illustrated in the exemplary embodiment, the configuration with the several structural elements removed therefrom may still be elicited as an disclosure insofar as an effect is obtained.

In the exemplary embodiment, the term "processor" refers to hardware in a broad sense. Examples of the processor include general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

Also, the exemplary embodiment applies an image forming device as an example of the device to be controlled, but device to be controlled is not limited thereto, and may be another device such as a smartphone that applies application software to execute a service.

Additionally, the exemplary embodiment describes a case where the information processing program 13A is preinstalled in the storage unit 13, but the configuration is not limited thereto. For example, the information processing program 13A may also be provided stored on a storage medium such as Compact Disc-Read-Only Memory (CD-ROM), or may be provided over a network.

Furthermore, the foregoing exemplary embodiment describes a case in which the information processing is achieved by a software configuration using a computer by executing a program, but the present disclosure is not limited thereto. For example, the information processing may also be achieved by a hardware configuration, or by a combination of a hardware configuration and a software configuration.

Figure 2:
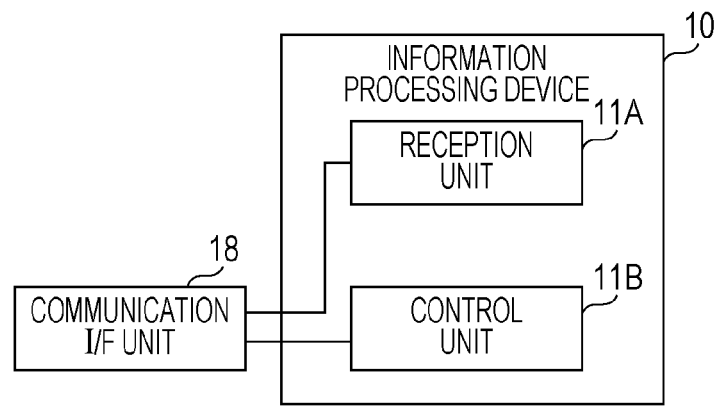
FIG. 2 is a block diagram illustrating an example of a functional configuration of an information processing device according to the exemplary embodiment.

Otherwise, the configuration of the image forming device 90 (see FIG. 1) and the configuration of the information processing device 10 (see FIGS. 2 to 4) described in the foregoing exemplary embodiment is a single example, and obviously, unnecessary portions may be removed or new portions may be added without departing from the scope of the present disclosure.

Also, the flow of the information processing (see FIG. 9) described in the foregoing exemplary embodiment is a single example, and obviously, unnecessary steps may be removed, new steps may be added, or the processing sequence may be rearranged without departing from the scope of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
    a processor configured to
        receive an addition of additional information by an administrator, the additional information including application software received from an external device to be executed on the information processing device,
        cause a display position of an image representing the additional information to be restricted in a case where an important attribute indicating importance is assigned to the additional information, and
        when the additional information is to replace other additional information corresponding to another image already being displayed, present an indication that the another image is a replacement target of the additional information.

2. The information processing device according to claim 1, wherein
    the restriction of the display position restricts the image to being placed at a position that is displayed in a continuously visible way.

3. The information processing device according to claim 1, wherein
    the restriction of the display position is a restriction related to a movement of the display position of the image.

4. The information processing device according to claim 2, wherein
    the restriction of the display position is a restriction related to a movement of the display position of the image.

5. The information processing device according to claim 1, wherein the processor is further configured to
    cause a display position of an image representing additional information that is not assigned with the important attribute, to be a predetermined position.

6. The information processing device according to claim 2, wherein the processor is further configured to
    cause a display position of an image representing additional information that is not assigned with the important attribute, to be a predetermined position.

7. The information processing device according to claim 3, wherein the processor is further configured to
    cause a display position of an image representing additional information that is not assigned with the important attribute, to be a predetermined position.

8. The information processing device according to claim 4, wherein the processor is further configured to
    cause a display position of an image representing additional information that is not assigned with the important attribute, to be a predetermined position.

9. The information processing device according to claim 5, wherein
    the processor is further configured to receive the predetermined position.

10. The information processing device according to claim 6, wherein
    the processor is further configured to receive the predetermined position.

11. The information processing device according to claim 7, wherein
    the processor is further configured to receive the predetermined position.

12. The information processing device according to claim 8, wherein
    the processor is further configured to receive the predetermined position.

13. The information processing device according to claim 1, wherein the processor is further configured to
    present an indication that a replacement attribute is assigned to the additional information in a case where the replacement attribute is assigned to the additional information, the replacement attribute being an attribute indicating that the additional information replaces additional information corresponding to an image already being displayed.

14. The information processing device according to claim 2, wherein the processor is further configured to
    present an indication that a replacement attribute is assigned to the additional information in a case where the replacement attribute is assigned to the additional information, the replacement attribute being an attribute indicating that the additional information replaces additional information corresponding to an image already being displayed.

15. The information processing device according to claim 13, wherein
    the processor is further configured to cause the image already being displayed to not be displayed.

16. The information processing device according to claim 14, wherein
    the processor is further configured to cause the image already being displayed to not be displayed.

17. The information processing device according to claim 13, wherein the processor is further configured to
    cause the image already being displayed to be displayed in an identifiable way before causing the additional information assigned with the replacement attribute to replace the additional information corresponding to the image already being displayed.

18. The information processing device according to claim 1, wherein the processor is further configured to
    cause an image representing the additional information assigned with the important attribute to be displayed in an identifiable way.

19. The information processing device according to claim 17, wherein
    the display in an identifiable way is an emphasized display.

20. A non-transitory computer readable medium storing a program causing a computer to execute a process for processing information, the process comprising:
    receiving an addition of additional information by an administrator, the additional information including application software received from an external device to be executed on the computer;
    causing a display position of an image representing the additional information to be restricted in a case where an important attribute indicating importance is assigned to the additional information; and when the additional information is to replace other additional information corresponding to another image already being displayed, presenting an indication that the another image is a replacement target of the additional information.

* * * * *